Patented Oct. 31, 1939

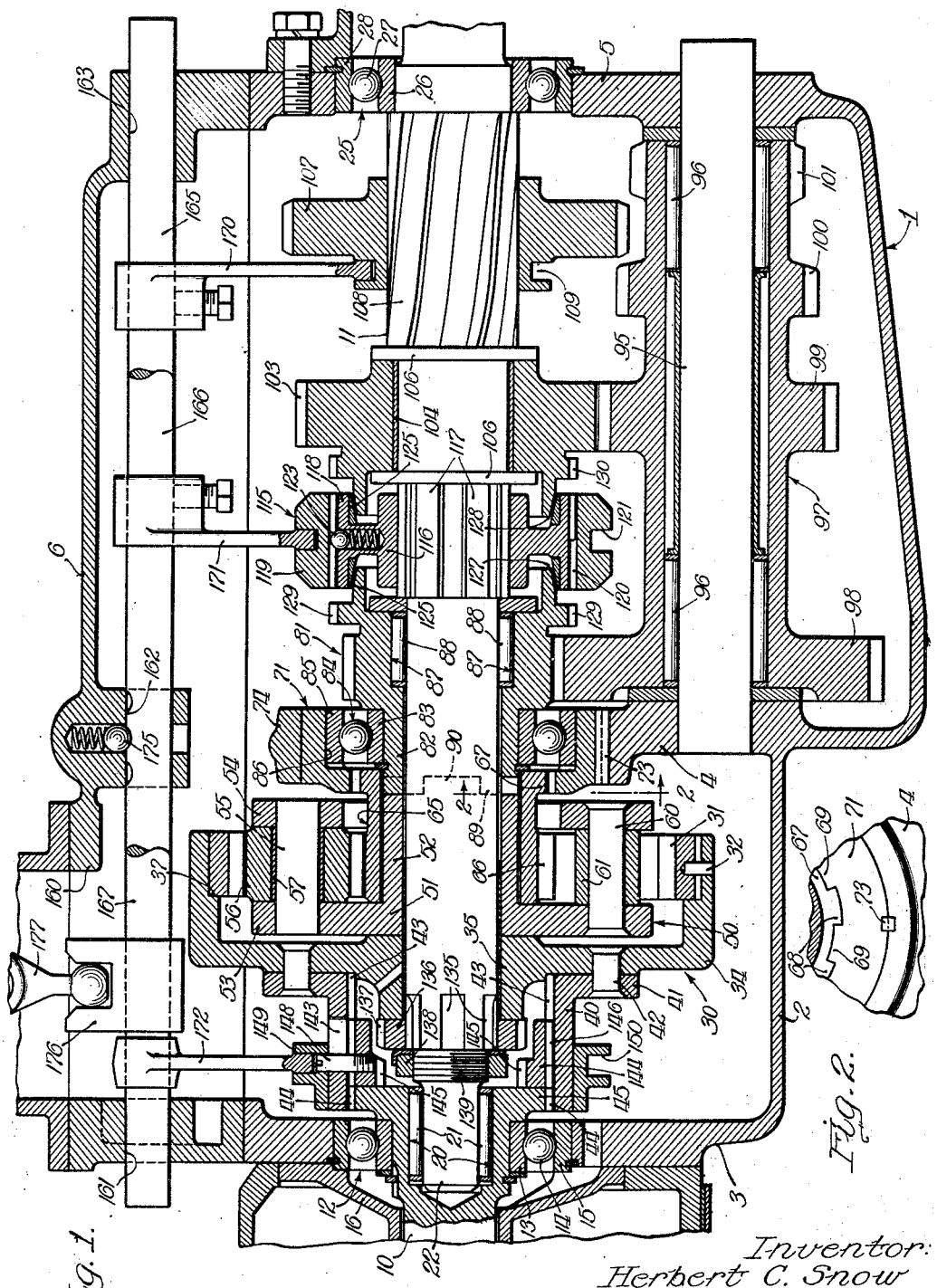

2,177,952

UNITED STATES PATENT OFFICE 2,177,952

TRANSMISSION

Herbert C. Snow, Auburn, Ind., assignor of one-fourth to Clarence H. Dooley, Rock Island, Ill., one-fourth to H. Keith Dooley, Los Angeles, Calif., and one-fourth to Delmar D. Dooley, Rock Island, Ill.

Application October 24, 1936, Serial No. 107,329

28 Claims. (Cl. 74—328)

The present invention relates generally to transmission for automotive vehicles and the like, and especially to transmissions of the type affording four forward speeds with two quiet top speeds of different ratios.

The principal object of the present invention is the provision of an automotive transmission having two available silent cruising speeds, one a direct ratio and the other a different ratio obtained by the use of a planetary gear unit placed on the driven shaft at the forward end of the transmission.

Another important object of the present invention is the provision of a planetary gear unit disposed in advance of the conventionally arranged pairs of gears, but in which the driving and driven shafts of the transmission can be directly connected together easily and conveniently so as to establish one of the two silent cruising speeds available in the transmission.

Another object of the present invention is the provision of a planetary reduction gear unit placed between the conventional gears of the transmission and the driving shaft and so arranged that the conventional transmission gears are driven at a reduced speed through the planetary gear unit, but in which the driving and driven shafts of the transmission can be connected directly together or the driven shaft can be connected to the driving shaft through only the planetary gear unit. By virtue of this construction, the conventional gearing of the transmission can be made smaller, inasmuch as a portion of the total gear reduction required is secured by virtue of the reduction afforded by the planetary gear unit.

Another object of the present invention is the provision of a transmission embodying a planetary gear unit, which may be either an overdrive unit or an underdrive unit, in which the countershaft of the transmission is driven, not from the driving shaft, as is conventional practice, but from the driven part of the planetary gear unit. A further object of the present invention in this connection is the arrangement of clutch means or the like whereby the driven shaft of the transmission may be connected with the part or gear of the planetary gear unit that drives the countershaft.

A further object of the present invention is the provision of a transmission having in the forward portion thereof a planetary gear set in which there is a ring gear member and a planet gear carrier member, with one member constantly connected to the driving shaft and the other member constantly connected to the gear that drives the transmission countershaft, and in which one of the members can also be connected to the driven shaft.

A further object is to directly connect the ring gear to the driving shaft and the gear carrier to the countershaft driving gear.

A further object of the present invention is the provision of improved supporting means for parts of the planetary gear unit so as to secure and maintain accurate alignment thereof throughout the life of the transmission.

These and other objects and advantages of the present invention will be apparent to those skilled in the art after a consideration of the preferred structure chosen to illustrate the principles of the present invention and shown in the accompanying drawing.

In the drawing:

Figure 1 is a longitudinal vertical section taken through an automobile transmission embodying the principles of the present invention; and Figure 2 is a section taken along the line 2—2 of Figure 1, and illustrates the manner of holding the sun gear against rotation and supporting the same in proper position in the transmission housing.

Referring now more particularly to Figure 1, the transmission housing is indicated in its entirety by the reference numeral 1 and includes a forward section 2 having a front wall 3, an intermediate transverse wall 4, and a rear wall 5. A cover 6, carrying three shift rods, which will be referred to later, is disposed over the open upper portion of the transmission housing 1, but if desired, the cover 6 may be at one side of the transmission, according to the type of shifting mechanism that is employed. The present invention is not concerned with the manner of operation or the structure employed in the shifting mechanism, and it therefore suffices to say that such shifting mechanism for the transmission may be either a manual control, a remote control, or some form of automatic control, as desired.

Driving and driven shafts 10 and 11 are journaled for rotation in the transmission housing 1. Preferably, the driving shaft 10 is supported at its rear end on bearing means 12, which includes an inner race 13 mounted on the rear end of the driving shaft 10, suitable anti-friction balls or rollers 14, and an outer race 15 mounted in any suitable manner in an opening in the forward front wall 3 of the transmission housing 1. Preferably, but not necessarily, the bearing 12 is held in place by a retainer cap 16. The rear end of the driving shaft 10 is recessed, as at 20, and receives bearing means 21 by which the forward reduced end 22 of the driven shaft 11 is piloted, the forward end of the driven shaft being thereby supported in the front wall 3 of the transmission housing. The rear end of the driven shaft 11 is provided with bearing means 25 which includes an inner race 26 fixed to the rear end of the driven shaft 11, anti-friction balls or rollers 27, and an outer race 28 fastened to the rear wall 5 of the transmission housing in any suitable manner.

A planetary gear unit, indicated in its entirety by the reference numeral 30, is placed on the driven shaft 11 at the forward end of the transmission and is arranged between the walls 3 and 4 of the transmission housing 1. The planetary gear unit 30 includes a ring gear 31 fixed in any suitable manner, as by one or more pins 32, to a ring gear carrying member 34 having a hub portion 35 that is journaled for rotation with respect to the forward end of the driven shaft 11. Preferably, the flange portion of the ring gear carrying member 34 is recessed, as at 37, to receive the ring gear 31. The ring gear is adapted to be constantly connected with and driven by the driving shaft 10 by means of a sleeve member 40 which has a flange 41 riveted, as at 42, or otherwise securely fastened to the web portion of the ring gear supporting member 34. The sleeve member 40 is splined, as at 43, and the splines 43 engage similar splines or teeth 44 formed in the peripheral portion of a radially outwardly extending flange 45 carried by the driving shaft 10. By this means, the members 31, 34 and 40 are constantly rotated with the driving shaft 10.

The planetary gear unit 30 also includes a planet gear carrier or spider 50 which comprises a member 51 having a hub portion 52 and a radially outwardly extending flange portion 53 which cooperates with an oppositely disposed ring 54 and receives and supports a plurality of pins 55 upon which the planet gears 56 of the planetary gear unit are mounted for rotation, as by bushings 57. The flange 53 and the ring member 54 are held in spaced relation by means of rivets 60 and spacing sleeves 61.

The sun gear of the planetary gear unit 30 is indicated by the reference numeral 65 and is provided with gear teeth 66 which mesh with the teeth of the planet gears 56, and one end portion of the sun gear 65 is flanged, as at 67, and is provided with a plurality of teeth or splines 68 which interengage with similar teeth or splines 69 formed on a ring member 71 carried by the intermediate wall 4 of the transmission housing 1 and fixedly held in place in any suitable manner, as by a key 73. A cap 74 is bolted in place over the ring member 71, as shown in Figure 1.

The intermediate wall 4 of the transmission housing 1 is arranged to rotatably support a countershaft driving gear that is indicated in its entirety by the reference numeral 81. The countershaft driving gear includes a hub section 82 receiving the inner race 83 of a bearing means 84, the outer race 85 of which is seated in a recess 86 formed in the ring member 71. This particular construction insures the proper alignment between the bearing means 84 and the sun gear 65, and since the bearing means 84 supports the countershaft driving gear 81, the axial alignment of all of these parts is insured, and likewise these parts are supported directly on the housing wall 4. The countershaft driving gear 81 includes an internally recessed portion 87 which receives bearing means 88 that serves to support the intermediate portion of the driven shaft 11. Since the two bearing means 84 and 88 are disposed closely adjacent one another, it will be seen that the intermediate portion of the driven shaft 11 is, in effect, firmly supported by the intermediate wall 4 of the transmission housing. The hub 82 of the gear member 81 has forwardly facing lugs 89 that engage rearwardly facing lugs 90 on the hub 52 of the planet gear carrier 50, whereby the latter is directly and constantly connected with the countershaft driving gear.

Disposed in the rear portion of the transmission housing are gear members of more or less conventional construction. In the lower rear portion of the transmission housing 1 a fixed shaft 95 is mounted in any suitable manner and rotatably supports as by bearing means 96, a tubular countershaft 97 having four gears 98, 99, 100 and 101 thereon. The countershaft gear 98 meshes with and is driven from the countershaft driving gear 81. It will be noted that the countershaft 97 is not driven from the driving shaft 10 directly, as in conventional practice, but is driven through the planetary gear unit which, in Figure 1, is a gear reduction unit, so that to secure any given gear reduction with respect to the driving shaft 10 does not require that the gear 98 shall be as large as usual at the present time. A gear 103 is mounted for rotation, as by a bushing 104, on the rear portion of the driven shaft 11, and is adapted to be maintained in constant mesh with the countershaft gear 99. The gear 103 is held in axial position by a pair of rings 106 or the like, and the gears 81, 98, 99 and 103 may be of a helical type if desired. A shiftable gear 107 is disposed on the splined portion 108 at the rear end of the driven shaft 11 and is shiftable thereon into optional engagement with the countershaft gear 100 or with a reverse idler (not shown) driven from the countershaft gear 101. The gear 107 has a hub provided with a shifter groove 109.

Disposed between the gears 81 and 103 is a shiftable clutch member, indicated in its entirety by the reference numeral 115, that provides for optional connection between the driven shaft 11 and the gears 81 and 103. The shiftable clutch member 115 includes a splined clutch hub 116 mounted on splines 117 on the driven shaft 11 forward of the gear 103. The outer peripheral portion 118 is also splined and carries a slidable clutch member 119 which is provided with a set of internal splines or teeth 120 and an exterior shift groove 121. Detent mechanism 123 serves to yieldingly hold the clutch member 119 in a central position relative to the shiftable clutch hub 116. The latter is provided with synchronizing cones 125 that cooperate with conical surfaces 127 and 128 formed on the adjacent portions of the countershaft driving gear 81 and the rotatably mounted gear 103. These gears are also provided with splined or toothed clutch flanges 129 and 130, respectively, that are adapted to be engaged in the final forward or rearward position of the shiftable clutch member 119. The purpose of the structure just described, which, per se, does not form any part of the present invention, is to synchronize the rotation of the gears 81 and 103 with the shiftable clutch hub 116 before the final engagement of these parts by the completion of the shifting movement of the clutch member 119.

At the forward end of the transmission, the front end of the driven shaft 11 is splined, as at 135, and receives a clutch collar 136 having external clutch teeth 137 formed thereon, and the clutch collar 136 is held in position by a nut 138 screwed onto the threaded portion 139 of the driven shaft 11. Adjacent the clutch collar 136 the ring gear connecting sleeve member 40 is slotted, as at 143, and a slidable clutch member 144, having internal clutch teeth 145 and exterior splines 146 interengaging with the interior splines 43 on the sleeve member 40, carries one or more pins 148 which extend outwardly through the slots 143 and are fastened to a shift collar 149 having an exterior groove 150 formed therein. The shift collar 149 is slidably mounted on the outside of the connecting sleeve member 40 between the ring gear member 34 and the flange 45 of the driving shaft 10. In Figure 1, the shiftable clutch member 144 is shown in its forwardmost position, and a rearward movement of the member 144 serves to engage the teeth 145 thereof with the teeth 137 on the collar 136 that is fixed to the forward end of the driven shaft 11, thus directly connecting the driving and driven shafts 10 and 11 together.

The present invention is not especially concerned with any particular means for shifting or otherwise controlling the position of the various parts of the transmission. For purposes of illustration, however, I have shown the transmission cover 6, which may be either at the top or side of the transmission housing 1 as mentioned above, as provided with a number of openings 161, 162 and 163 formed in bosses or the like on the cover and accommodating three shift rods 165, 166 and 167 upon which shift forks 170, 171 and 172, respectively, are mounted. The shift fork 170 engages in the shift groove 109 on the gear 107, the shift fork 171 engages in the grooves 121 formed in the shiftable clutch member 119, and the shift fork 172 engages in the shift groove 150 in the slidable collar 149. Each of the shift rods is provided with the usual detent means 175 by which the shift forks are held in their proper position, and each shift rod also includes a yoke 176 in which the lower end of a lever 177 or other means is adapted to be engaged. The lever 177 represents any form of controlling mechanism for operating the transmission.

The operation of the transmission described above is substantially as follows:

For reverse, the gear 107 is shifted rearwardly by a rearward movement of the shift rod 165 and shift fork 170, and low, or first, speed is engaged by a forward movement of these parts, causing the gear 107 to mesh with the countershaft gear 100. It will be recalled that there is a constant driving connection from the driving shaft 10 to the ring gear 31 of the planetary gear unit 30 and that there is a constant driving connection between the planet gear carrier 50 and the gear member 81 that drives the countershaft through the gear 98. Thus, whenever the gear 107 is shifted forwardly into engagement with the countershaft gear 100, the driven shaft 11, to which the gear 107 is splined, is driven through the planetary gear unit and the countershaft. In the preferred form of construction, the planetary gear unit 30 affords a gear reduction of approximately 30%, and hence the reduction from the driving to the driven shafts that is provided by virtue of the ratio between the diameters of the countershafts 81, 98 and 100, 107 need not be as great as if the gear 81 were directly driven from the driving shaft 10. Hence, the countershaft gears can be smaller than in ordinary practice.

To engage second speed, the clutch member 119 is shifted rearwardly so as to bring the teeth 120 thereof into clutching engagement with the teeth 130 on the gear member 103 that is in constant mesh with the countershaft gear 99. Hence, when this ratio is selected, the drive is transmitted from the driving shaft 10 through the planetary gear unit 30 to the countershaft 97, and from thence through the constant mesh gears 99 and 103 to the driven shaft 11. The shiftable clutch member 119 is moved rearwardly into engagement with the gear member 103 by a rearward movement of the shift rod 166.

Third speed forward is engaged by a forward movement of the shift rod 166, which carries the clutch member 119 forwardly so that the teeth 120 thereof engage the clutch teeth 129 on the countershaft driving gear member 81. Since this member is directly connected with the planet gear carrier 50, the driven shaft 11 is thus driven from the driving shaft 10 through the reduction that is afforded by the planetary gear unit 30. By virtue of the unit 30 being a planetary gear unit, the drive in this selected ratio is silent and, at the same time, affords a relatively high speed cruising ratio, especially where the rear axle ratio is approximately 3 to 1. In both the rearward and forward movements of the shiftable clutch member 119, the synchronizing clutches associated therewith operate in the usual manner to bring the toothed clutches into substantial synchronism before their actual engagement is effected.

Fourth speed forward, or direct, which cuts out the planetary gear unit 30, is effected by a rearward movement of the shift rod 167 which causes the shift fork 172 to move the clutch member 144 rearwardly along the internal splines 43 and into engagement with the clutch collar 137 fixed to the forward end of the driven shaft 11. By virtue of the constant engagement between the connection sleeve 40 and the driving shaft 10, the clutch member 144 is likewise constantly connected with the driving shaft 10, and hence when the members 136 and 144 are engaged, the aforesaid direct connection between the driving and driven shafts 10 and 11 is effected. Since there is a constant connection between the ring gear 31 of the planetary gear unit and the driving shaft 10, and a similar constant connection between the countershaft driving gear 81 and the planet gear carrier 50 of the planetary gear unit, the latter, together with the countershaft 97, rotate idly in fourth speed.

While I have shown the preferred form of construction, in which the clutch member 144 is controlled by a shift rod or other means in substantially the same manner that the conventional transmission is controlled, it is to be understood that other means, either manual, remotely actuated, or semi- or fully automatic, may be employed for governing the position of the clutch member 144 which controls the important operation of determining whether the drive is transmitted directly from the driving to the driven shaft or from the driving shaft to the driven shaft through the planetary gear unit that is disposed generally forwardly of the conventional transmission elements. Thus, while I have shown and described above the preferred form of the present invention, it will be understood that my invention is not to be limited to the particular details shown and described, but that, in fact, widely different means may be employed in the practice of the broader aspects of my invention.

What I claim, therefore, and desire to secure by Letters Patent is:

1. In a transmission system, a clutch shaft, a selective gear transmission including a driven shaft, a planetary gear unit disposed between said clutch shaft and said selective gear transmission, said planetary gear unit including a part permanently connected with said clutch shaft, and a clutch on said clutch shaft shiftable relative to said permanently connected part into engagement with said driven shaft.

2. The combination with a transmission including a driven shaft and a countershaft driving gear, of a driving shaft, a planetary gear unit between said countershaft driving gear and said driving shaft, and clutch means including two interengageable parts carried, respectively, by and connected at all times to rotate, respectively, with said driving and driven shafts for connecting the latter.

3. The combination with a transmission including a countershaft driving gear and a driven shaft, of a driving shaft, a planetary gear unit for driving said countershaft driving gear from said driving shaft and including a ring gear connected with the driving shaft, and clutch means movable with said ring gear and adapted to connect with said driven shaft.

4. In combination, a transmission including a countershaft driving gear and a driven shaft extending forwardly from the transmission and receiving said countershaft driving gear, a driving shaft, a planetary gear unit disposed about the forward end of said driven shaft and operatively connected between said driving shaft and said countershaft driving gear, and clutch mechanism disposed forwardly of said planetary gear unit and adapted to connect said driving and driven shafts directly together.

5. The combination with a selective gear transmission including a driven shaft and a countershaft driving gear, of a driving shaft, a planetary gear unit including a ring gear member and a planet gear spider member, means directly connecting one of said members with said driving shaft, and means directly connecting the other of said members with said countershaft driving gear.

6. The combination with a selective gear transmission including a driven shaft and a countershaft driving gear, of a driving shaft, a planetary gear unit including a ring gear member and a planet gear spider member, means directly connecting one of said members with said driving shaft, means directly connecting the other of said members with said countershaft driving member whereby the latter is constantly driven through said planetary gear unit from said driving shaft, and clutch mechanism arranged to directly connect said driven shaft with said driving shaft.

7. A transmission comprising a housing, axially aligned driving and driven shafts journaled for rotation therein, a planetary gear unit disposed between said driving and driven shafts and having a driving part constantly connected with said driving shaft, a countershaft journaled for rotation in said housing rearwardly of said planetary gear unit, means for driving said countershaft from the driven part of said planetary gear unit, and a clutch for directly connecting the driving shaft to the driven shaft.

8. A transmission comprising a housing, a driven shaft extending substantially from one end to the other thereof, a driving shaft having its rear end journaled for rotation in the forward wall of the transmission housing, a planetary gear unit disposed between said shafts in the forward portion of said transmission housing and driven from said driving shaft, an intermediate wall in said transmission housing a countershaft having its forward end supported on said intermediate wall, said planetary gear unit being mounted about the forward end of said driven shaft forwardly of said intermediate wall, a gear member journaled for rotation about the driven shaft and supported by said intermediate wall, said gear member being connected to rotate said countershaft, and means for driving said gear member from the driven part of said planetary gear unit.

9. In a transmission embodying a housing and driving and driven shafts journaled therein, a planetary gear unit comprising a ring gear connected with said driving shaft, a plurality of planet gears, a planet gear carrier therefor disposed about and rotatable relative to the other shaft, a sun gear meshing with said planet gears, and means in the housing for driving said other shaft from said planet gear carrier at different selected ratios.

10. In a transmission embodying a housing, driving and driven shafts journaled therein, and a countershaft driving gear mounted for rotation about the driven shaft, a planetary gear unit comprising a ring gear connected with said driving shaft, a plurality of planet gears, and a planet gear carrier therefor mounted for rotation about said driven shaft and connected to drive said countershaft driving gear.

11. In a transmission embodying a housing, driving and driven shafts journaled for rotation therein, and a countershaft driving gear journaled for rotation with respect to one of said shafts, a planetary gear unit comprising a ring gear member connected with said driving shaft, a plurality of planet gears, a planet gear carrier member therefor disposed about the other shaft, a sun gear meshing with said planet gears, a ring supported in fixed position in said housing and including a splined portion and a bearing receiving portion, means on said sun gear cooperating with said splined portion of said ring for fixing the sun gear in position in the housing, bearing means disposed in the bearing portion of said ring for supporting said countershaft driving gear, means for connecting one of said mebers with the driving shaft, and means for connecting the other of said members with said countershaft driving gear.

12. In a transmission embodying a housing, driving and driven shafts journaled for rotation therein, and a countershaft driving gear journaled for rotation with respect to one of said shafts, a planetary gear unit comprising a ring gear connected with said driving shaft, a plurality of planet gears, a planet gear carrier therefor disposed about the other shaft, a sun gear meshing with said planet gears, a ring member supported in fixed position in said housing and including a splined portion and a bearing receiving portion, means on said sun gear cooperating with said splined portion of said ring member for fixing the sun gear in position in the housing, bearing means disposed in the bearing portion of said ring member for supporting said countershaft driving gear, and a second bearing means disposed adjacent said first mentioned bearing means and disposed between said countershaft driving gear and said driven shaft so as to maintain the latter, said countershaft driving gear and said sun gear in coaxial relation.

13. A transmission comprising a housing, a driving shaft journaled for rotation therein, a countershaft driving gear spaced axially from the rear end of said driving shaft, a planetary gear unit disposed between said countershaft driving gear and said end of the driving shaft and comprising a sun gear, a ring gear member and a planet gear carrier member, means for holding said sun gear against rotation, means for connecting the ring gear member with said driving shaft, and means for connecting the planet gear carrier member with said countershaft driving gear.

14. A transmission comprising a housing, a driving shaft journaled from the forward wall thereof, said housing having an intermediate wall, a countershaft driving gear journaled for rotation in said intermediate wall, a planetary gear unit disposed between said forward wall and said intermediate wall and comprising a ring gear member connected directly to said driving shaft, a sun gear connected to said intermediate wall and held against rotation with respect thereto, a planet gear carrier, and means directly connecting said planet gear carrier with said countershaft driving gear.

15. A transmission comprising a housing, a countershaft driving gear supported for rotation in one wall of said housing, driving and driven shafts mounted for rotation in said housing, a planetary gear unit disposed forwardly of said housing wall and including a ring gear directly connected to said driving shaft and a planet gear carrier directly connected to said countershaft driving gear, and clutch means adapted to directly connect said driving and driven shafts.

16. A transmission comprising driving and driven shafts, a countershaft driving gear separate therefrom, a planetary gear unit disposed between said driving shaft and said countershaft driving gear and comprising a ring gear member and a planet gear carrier member, means directly connecting one of said members with said driving shaft, means directly connecting the other of said members with said countershaft driving gear, clutch means for directly connecting said driving and driven shafts together, and separate clutch means for connecting said driven shaft with the other of said members.

17. A transmission comprising a casing, pairs of gears mounted in the rear portion of said casing and providing two speeds forward, a driving shaft, means including a planetary gear unit in the forward portion of said casing for driving all of said gears through said planetary gear unit, a driven shaft journaled for rotation in said casing, and clutch means shunting said planetary gear unit for directly connecting said driving and driven shafts independently of said planetary gear unit.

18. A selective gear transmission including driving means, a driven shaft, a countershaft driving gear, a planetary gear unit including a ring gear member and a planet gear spider member, means permanently connecting one of said members with said driving means, means adapted to directly connect the other of said members with said countershaft driving gear for driving the latter at a rate different than the rate of rotation of said driving means, and clutch means including a toothed part shiftable relative to said driving means and adapted to directly connect with said driven shaft for driving the latter at the same rate as the driving means.

19. A transmission comprising driving means, a driven shaft, a countershaft driving gear separate therefrom, a planetary gear unit disposed between said driving means and said countershaft driving gear and comprising a ring gear member and a planet gear carrier member, means directly connecting one of said members with said driving means, means directly connecting the other of said members with said countershaft driving gear, clutch means for connecting the driven shaft with said countershaft driving gear, and clutch means separate from said first mentioned clutch means for directly connecting said driving means and said driven shaft.

20. The combination with a transmission including a driven shaft and a countershaft driving gear, of a driving shaft, a planetary gear unit between said countershaft driving gear and said driving shaft, said planetary gear unit including a plurality of planet gear, a stationary sun gear receiving the reaction of said planet gears, a ring gear and a planet carrier, means connecting said ring gear to said driving shaft, means connecting said planet carrier to said countershaft driving gear, for driving the latter from said driving shaft through said ring gear, and clutch means for connecting said driving and driven shafts independently of said planetary gear unit.

21. The combination with a selective gear transmission including a driven shaft and a countershaft driving gear, of a driving shaft, a planetary gear unit including a ring gear member constantly connected to said driving shaft and a planet gear spider member constantly connected to said countershaft driving gear, and clutch means directly connecting said driving and driven shafts independently of said planetary gear unit.

22. The combination with a selective gear transmission including a driven shaft and a countershaft driving gear, of a driving shaft, a planetary gear unit mounted forwardly of said countershaft driving gear and including a stationary sun gear, a ring gear member and a planet gear spider member, means constantly connecting said ring gear member with said driving shaft, means constantly connecting said planet gear spider member with said countershaft driving gear, and means forward of said planetary gear unit for optionally connecting said driven shaft to said driving shaft.

23. In a transmission embodying a housing and driving and driven shafts and a countershaft driving gear journaled therein, a planetary gear unit comprising a ring gear connected with said driving shaft, a plurality of planet gears, a planet gear carrier therefor disposed about the other shaft and directly connected to said countershaft driving gear, a sun gear meshing with said planet gears, and means on the housing for detachably supporting said sun gear.

24. In a transmission embodying a housing, driving and driven shafts journaled therein and a countershaft driving gear also journaled in said housing, a planetary gear unit comprising a ring gear connected with said driving shaft, a plurality of planet gears, and a planet gear carrier therefor disposed about the driven shaft and directly connected to said countershaft driving gear.

25. A transmission comprising a housing, a driving shaft journaled for rotation therein, a countershaft driving gear spaced axially from the rear end of said driving shaft, a planetary gear unit disposed between said countershaft driving gear and said end of the driving shaft and comprising a sun gear, a ring gear member and a planet gear carrier member, means for holding said sun gear against rotation, means for connecting the ring gear member with said driving shaft, and means for connecting the planet gear carrier member with said countershaft driving gear.

26. The combination with a transmission including a countershaft driving gear and a driven shaft, of a driving shaft, a planetary gear unit for driving said countershaft driving gear from said driving shaft and including a ring gear connected with the driving shaft, and clutch means directly connecting said driving and driven shafts independently of said planetary gear unit.

27. In a transmission, axially aligned driving and driven shafts, an apertured member connected in driving engagement with the rear end of the driving shaft and embracing the forward end of the driven shaft, a planetary gear unit disposed about said driven shaft and including a driving member connected to said apertured member and a driven member rotatable about said driven shaft, a collar fixed to the forward end of the driven shaft and having clutch teeth thereon, a shiftable clutch member in engagement with said driving shaft through said apertured member and having portions extending through said aperture, such shiftable clutch member being adapted to engage said collar for directly connecting said driving and driven shafts, and shift means carried by said driven shaft and movable optionally into engagement with the driven member of said planetary gear unit.

28. In a transmission, a driven shaft, a countershaft driving gear receiving said driven shaft for rotation relative thereto, a driving shaft, a planetary gear unit between said driving shaft and said countershaft driving gear, clutch means directly connecting said countershaft driving gear to said driven shaft, said planetary gear unit including a plurality of planet gears, a stationary sun gear, a ring gear, and a planet gear carrier connected to drive said countershaft driving gear, and means connecting said ring gear to said driving shaft for transmitting the drive through said ring gear to said countershaft driving gear.

HERBERT C. SNOW.